3,372,156
IMPROVING THE SOLUBILITY OF HIGH-MOLECU-
LAR WEIGHT SUBSTANCES BY DIALDEHYDE
POLYSACCHARIDE TREATMENT
Franz Schwarzer, Wiesbaden, and Hans Macholdt, Wiesbaden-Biebrich, Germany, assignors to Kalle Aktiengesellschaft, Wiesbaden-Biebrich, Germany, a corporation of Germany
No Drawing. Filed Aug. 27, 1964, Ser. No. 392,631
Claims priority, application Germany, Aug. 30, 1963,
K 50,689
12 Claims. (Cl. 260—232)

ABSTRACT OF THE DISCLOSURE

This invention relates to a process for improving the solubility of a macromolecular carbohydrate and derivatives thereof and polyvinyl alcohol and derivatives thereof and to a compound of such improved solubility, the process comprising treating the compound at an elevated temperature with a dialdehyde polysaccharide in a quantity of about 0.1 to 10 percent by weight.

---

It is known that improved solubility of cellulose ethers in water or aqueous media can be achieved by treating them with bifunctional compounds having a cross-linking effect, such as diketones, ketoaldehydes, dialdehydes, halogen aldehydes, dihalogen compounds, diepoxides and halogen epoxides. However, among these compounds only glyoxal has achieved any industrial importance to date.

It is also known that the solubility of polyvinyl alcohol in water can be improved by treating it with formaldehyde or with a monomeric dialdehyde, such as glyoxal.

In both cases, the agent which improves the solubility is a monomeric bifunctional compound. However, most of these compounds are highly reactive and cannot be handled without risk unless special technical precautions are taken. In addition, any proportion of the monomers that has not reacted with the polymers, whose solubility it is intended to improve, must be removed from the reaction mixture in a special operation. Finally, any monomers which are insoluble or only sparingly soluble in water are difficult to supply in measured quantities. However, accurate amounts are essential because the agent is often used in a relatively small proportion.

The present invention provides a process which obviates the aforementioned disadvantages. According to the new process, the solubility of water-soluble or water-swellable macromolecular carbohydrates or the derivatives of such carbohydrates, especially cellulose ethers, and of polyvinyl alcohols and their derivatives, can be improved by treating them at an elevated temperature with a dialdehyde polysaccharide, preferably with dialdehyde starch, used in an amount of 0.1 to 10 percent by weight. When the dialdehyde polysaccharides are used instead of the hitherto known monomers listed above there are obtained products of at least equivalent if not better solubility, and by a substantially simpler method. Thus, being polymers, the dialdehyde polysaccharides are easier to measure out and are very readily compatible with the macromolecular compounds to be dissolved. Furthermore, in contradistinction to monomers known for similar uses, they have no odor and are not highly reactive so they can be handled in aqueous solutions without any danger and without special precautionary measures.

Particularly suitable dialdehyde polysaccharides for use in the process of the invention are the dialdehyde forms of cellulose, dextrane and galactomannane, and especially dialdehyde starch, which is an inexpensive commercial product.

The present process may be applied to a wide variety of water-soluble or water-swellable macromolecular substances based on carbohydrates or on polyvinyl alcohol. These substances are initially readily soluble or swellable in water and form genuine or colloidal solutions. However, by superficial gelling, or by lump formation when substances in finely dispersed form are to be dissolved, which in most cases cannot be prevented even by violent mechanical agitation during the solution process, the complete solution operation is often greatly retarded.

As macromolecular substances having the above-mentioned properties, whose solubility can be substantially improved by the present process, there may be mentioned water-soluble or water-swellable cellulose ethers or esters, starch ethers and water-soluble starch esters, modified starches, vegetable gums or their derivatives, alginates and similar compounds, and also polyvinyl alcohol and its water-soluble and/or water-swellable derivatives, for example partially etherified or esterified polyvinyl alcohols, such as polyvinyl acetate and the like.

The present process may be applied with particular advantage to cellulose derivatives, especially cellulose ethers.

As suitable cellulose ethers there may be mentioned cellulose alkali ethers, for example methylcellulose, hydroxyalkyl cellulose ethers, for example hydroxyethylcellulose, carboxyalkylcellulose ethers, for example carboxymethylcellulose, and mixed ethers including various of the functional groups present in the ether groups mentioned.

The amount of dialdehyde polysaccharide to be added to the macromolecular substance whose solubility is to be improved ranges from 0.1 to 10 percent, preferable from 0.3 to 5 percent by weight.

In general, the process is performed in a neutral medium or at a pH value close to the neutral point.

It is advantatgeous to heat the mixture resulting from the application of the dialdehyde polysaccharide to the macromolecular substance to a temperature ranging from 60 to 130° C., preferably from 90 to 110° C. This is best achieved by drying the mixtures in hot air.

The method of carrying out the present process is described below in the case of the improvement of the solubility of cellulose ethers by treatment with dialdehyde starch. In a similar manner an improvement may be effected in the solubility of other macromolecular substances listed above with the use of dialdehyde starch or other dialdehyde polysaccharides.

The process may be performed in a variety of ways. Thus, for example, dialdehyde starch (a white powder having an average particle size below 50μ) may be mixed with the dry cellulose ether and the mixture moistened with solvent and/or water and thereby caused to swell slightly. The swelled mixture is then dried, advantageously at 90 to 110° C. A cellulose ether treated in this manner displays improved solubility.

A more uniform distribution of the dialdehyde starch, and as a result a more uniform treatment of the cellulose ether, can be achieved by using instead of solid dialdehyde starch a solution thereof in water or in a dilute salt solution, for example in a 1 percent solution of sodium acetate or sodium borate, which is dropped or sprayed onto the cellulose ether moistened with water or solvent.

This can be carried out during the manufacture of the cellulose ether, for example on the conveyor belts carrying the moist material to the drying machines. It is also possible to add these solutions during the manufacture of the cellulose ether, during or after the last desalting or washing charge. The cellulose ether may be used in the fibrous or particulate form.

According to another embodiment of the process, the dialdehyde starch solution is added to the cellulose ethers during preparative treatment of the latter, i.e., during conversion from the fibrous into the particulate form. During this preparation, to the cellulose ether, moist with water or alcohol, water is added in sufficient quantity to cause it to swell; this water may be admixed with the dialdehyde starch solution. The preparative treatment may then be performed by a known method; for example a solvent may be added for deswelling, which is then expressed or centrifuged off and the particulate cellulose ether is dried and comminuted. Alternatively, the swelled cellulose ether may be homogenized, densified, comminuted and dried. The cellulose ether converted into the particulate or pulverulent form by one of these methods with treatment by means of dialdehyde starch, displays substantially improved solubility. The addition of the cross-linking agent during the preparative treatment is the simplest and best industrial method.

As the above method indicates, the process of the invention can be included in the hitherto known processes for the manufacture of cellulose ethers without requiring any additional operations.

Cellulose ethers, starch ethers or other hydroxylated water-soluble or water-swellable macromolecular carbohydrates and polyvinyl alcohols and derivatives of these substances are probably cross-linked by the dialdehyde polysaccharide. This cross-linking occurs predominantly on heating, i.e., during drying. In this manner, the solubility of the macromolecular substances is improved so extensively that even in the pulverulent form they can be stirred into water or aqueous alkalies without forming lumps. In addition, the initial dissolution of the cross-linked products is delayed, i.e., while being stirred into the solvent they settle on the bottom without swelling. The cross-linking is then hydrolytically split by water so that it is reversible, and the solution rapidly becomes viscous. This progress of the dissolution can be checked with a viscograph. The shape of the solution curves reveals the degree and nature of the cross-linking, and the speed at which the material dissolves.

The following examples further illustrate the invention. The cellulose ethers used are identified by their viscosity $\eta$ in centipoises measured in 2 percent aqueous solution by the method of Höppler.

Example 1

Fibrous, desalted methylcellulose having a viscosity of $\eta=10,000$ centipoises, of 30 percent $OCH_3$ content, and moist with water, in a quantity corresponding to 500 grams of anhydrous cellulose ether, was mixed with an aqueous dialdehyde starch solution.

The dialdehyde starch was used in an amount of 1 percent by weight based upon dry cellulose ether. The amount of water was such that the cellulose ether was moistened to a water content of 65 to 70 percent by weight. The material was then kneaded, densified, comminuted, dried at 100° C. and then ground to a powder having an average particle size under 200μ. The powder obtained in this manner could be stirred into water without forming lumps, whereas a powder prepared in a similar manner but without the addition of dialdehyde starch had a marked tendency to lump formation.

A similar process was performed with methylcellulose having a viscosity of $\eta=200$ centipoises, of 28 percent $OCH_3$ content; the cellulose was moistened to a water content of 60 to 65 percent by weight. The resulting product similarly displayed a substantially better solubility than methylcellulose not treated with dialdehyde starch.

Example 2

Moist hydroxyethylcellulose ($\eta=4000$ centipoises, $OC_2H_4$ content=30 percent), corresponding to 1 kg. of anhydrous cellulose ether, was sprayed with dialdehyde starch dissolved in a mixture of 1 percent sodium acetate solution and water in quantities such that the product had a moisture content of 65 to 70 percent by weight and contained 0.2 percent by weight of dialdehyde starch based upon dry hydroxymethylcellulose. The material was kneaded, densified, granulated, dried at 90° C. in a rotary air drier and ground. The resulting powder displayed better solubility than the starting material. A hydroxyethylcellulose of low viscosity ($\eta=300$ centipoises) was treated in an analogous manner and yielded the same result.

Example 3

150 grams of hydroxyethylcellulose (average particle size 100μ viscosity $\eta=4000$ centipoises) was moistened with a mixture of 32 grams of acetone, 32 grams of methanol and 10 grams of water. The moist, but not swelled, product was then sprayed with 5 ml. of 10 percent by weight dialdehyde starch solution in 1 percent by weight borax solution, corresponding to 0.33 percent by weight of dialdehyde starch based upon the cellulose ether used. The product was dried for one hour at 80° C. in a drying cabinet, after which it still displayed the same fineness as before and had improved solubility.

Example 4

Moist, desalted carboxymethylcellulose, corresponding to 1 kg. of anhydrous carboxymethylcellulose, was kneaded with water and dialdehyde starch in quantities such that the product contained 65 to 70 percent by weight of water and 0.5 percent by weight of dialdehyde starch based upon dry carboxymethylcellulose. The product was then densified, granulated, dried and ground. Drying was effected in a blower drier into which air was inducted at a temperature of 130° C. Whereas carboxymethylcellulose, subjected to the same process but without the addition of dialdehyde starch solution, had a marked tendency to lump formation, the carboxymethylcellulose treated with dialdehyde starch displayed very good solubility.

Example 5

A mixture of 10 ml. of water, 30 ml. of acetone, and 5 ml. of a 10 percent solution of dialdehyde starch was added dropwise to 100 g. of tragacanth of a medium grain size of 40μ and 110 centipoises according to Höppler, in a 2.5 percent aqueous solution. The material was thoroughly mixed and then dried for half an hour at 100° C.

Whereas the starting material formed lumps when stirred into water, the material treated as described and having the same particle size could be stirred into water without lump formation.

It will be obvious to those skilled in the art that many modifications may be made within the scope of the present invention without departing from the spirit thereof, and the invention includes all such modifications.

What is claimed:

1. A process for improving the solubility of a compound selected from the group consisting of water-soluble and water-swellable macromolecular carbohydrates and polyvinyl alcohol and water-soluble and water-swellable derivatives thereof which comprises treating the compound at an effective elevated temperature with a dialdehyde polysaccharide in a quantity of about 0.1 to 10 percent by weight.

2. A process according to claim 1 in which the treatment is effected at a temperature in the range of about 60 to 130° C.

3. A process according to claim 1 in which the compound is methylcellulose.

4. A process according to claim 1 in which the compound is hydroxyethylcellulose.

5. A process according to claim 1 in which the compound is carboxymethylcellulose.

6. A process according to claim 1 in which the polysaccharide is dialdehyde starch.

7. A compound of improved solubility selected from the group consisting of water-soluble and water-swellable macromolecular carbohydrates and polyvinyl alcohol and water-soluble and water-swellable derivatives thereof prepared by treating the compound at an effective elevated temperature with a dialdehyde polysaccharide in a quantity of about 0.1 to 10 percent by weight.

8. A compound according to claim 7 in which the treatment is effected at a temperature in the range of about 60 to 130° C.

9. A compound according to claim 7 in which the compound is methylcellulose.

10. A compound according to claim 7 in which the compound is hydroxyethylcellulose.

11. A compound according to claim 7 in which the compound is carboxymethylcellulose.

12. A compound according to claim 7 in which the polysaccharide is dialdehyde starch.

No references cited.

WILLIAM H. SHORT, *Primary Examiner.*

J. NORRIS, *Assistant Examiner.*